United States Patent
Hurley et al.

(10) Patent No.: US 8,126,781 B2
(45) Date of Patent: Feb. 28, 2012

(54) REAL-TIME COLLABORATIVE SELECTION OF SERVICE PROVIDERS

(75) Inventors: Jay Hurley, Watsonville, CA (US); Vikram Subramaniam, San Jose, CA (US); Greg McCullough, San Jose, CA (US)

(73) Assignee: Cross Loop, Inc., Monterey, CA (US)

( * ) Notice: Subject to any disclaimer, the term of this patent is extended or adjusted under 35 U.S.C. 154(b) by 203 days.

(21) Appl. No.: 12/643,949

(22) Filed: Dec. 21, 2009

(65) Prior Publication Data

US 2010/0205100 A1    Aug. 12, 2010

Related U.S. Application Data

(63) Continuation-in-part of application No. 12/367,494, filed on Feb. 6, 2009.

(60) Provisional application No. 61/264,366, filed on Nov. 25, 2009.

(51) Int. Cl.
*G06Q 30/00* (2012.01)

(52) U.S. Cl. .................................. 705/26.1; 705/27.1

(58) Field of Classification Search ......... 705/26.1–27.2
See application file for complete search history.

(56) References Cited

U.S. PATENT DOCUMENTS

| | | | | |
|---|---|---|---|---|
| 2002/0065758 | A1* | 5/2002 | Henley | 705/37 |
| 2003/0055738 | A1* | 3/2003 | Alie | 705/26 |
| 2003/0216928 | A1* | 11/2003 | Shour | 705/1 |

OTHER PUBLICATIONS

Leading by example: almost a century ago, this company revolutionized the auto parts retailing industry with a catalog; now, it leads the way with an award-winning Web site. ( Retail Report: JC Whitney ); Retail Merchandiser , v 48 , n 3 , p. 56 May 2008.*

* cited by examiner

*Primary Examiner* — Jeffrey A Smith
*Assistant Examiner* — Resha Desai
(74) *Attorney, Agent, or Firm* — Soquel Group, LLC

(57) ABSTRACT

A method and system for customer service, comprising enabling a customer to provide a request for service, receiving the request for service from the customer and providing a website that enables a service provider to view the request for service, interactively chat about the request for service with other service providers, and respond to the request for service by creating and sending an offer of service to the customer and enabling the customer to accept the offer of service.

5 Claims, 10 Drawing Sheets

REAL-TIME COLLABORATIVE SELECTION OF SERVICE PROVIDERS

PRIORITY REFERENCE TO RELATED APPLICATIONS

This application claims benefit of U.S. Provisional Application No. 61/264,366, entitled "Real-Time Collaborative Selection of Service Providers", filed on Nov. 25, 2009 by inventor Jay Hurley, et al.

This application is a continuation-in-part of pending application U.S. Ser. No. 12/367,494, filed on Feb. 6, 2009, entitled "Three Party Services Transaction System."

FIELD OF THE INVENTION

The present invention relates to online provision of services. In particular it deals with systems and methods that match a service provider to a customer seeking service.

BACKGROUND OF THE INVENTION

E-commerce technology enables consumers to purchase items of merchandise on-line. Pioneers of e-commerce include Amazon.com, Inc. of Seattle, Wash. and eBay Inc. of San Jose, Calif. Generally, e-commerce websites such as Amazon.com have focused on enabling companies to sell merchandise on-lines from websites that act as virtual stores. eBay added the ability for individuals and companies ("sellers") to auction both used and new items of merchandise to the highest bidder. Because of the complexities and risks associated witch auctioning items of merchandise, the eBay system includes a means for buyers and sellers to exchange information, separate from the main bidding mechanism.

More recently, online marketplaces for online buying and selling of services such as programming, web design, accounting, legal, writing and translation have emerged. One pioneer of online service marketplaces is Elance, Inc. of Mountain View, Calif. Elance allows a customer to describe a project, offer the project to service providers, registered with the Elance service, to bid on, accept bids from such service providers, and select a bid.

Thus, services marketplaces now enable providers of services and individuals as well as companies seeking services (henceforth referred to simply as customers) to discover each other and enter into services agreements.

Typically companies that provide online services including, but not limited to, technical support and customer service, maintain a call center in which employees or contracted workers are available to respond to incoming phone calls, emails and to engage in chat sessions. Various methods are used to direct an incoming request for service to an employee or contracted worker. Such schemes include round robin, next available and others.

In a service marketplace, there may be several providers of services, henceforth referred to as providers, available to respond to an incoming request for service at any instant. In a chat-based system, the chat message includes information describing the request for service. Using prior art methods for selecting a provider from a group of available providers, the information in the chat message is not taken into account. Thus, information that might help select the best available provider to respond to a request for service is not taken into account.

There is thus a need for a system that enables the information in a chat message to be taken into account when selecting an available provider to respond to an incoming request for service.

In a service marketplace, typically the customer selects the service provider based on information made available by the service marketplace. Thus, the burden of reviewing information and making a selection of service provider falls on the customer. However, it is the service providers themselves who are in the best position to determine whether they are suited to provide a particular service to a customer. Therefore it would be advantageous, in a service marketplace, to enable the service provider to participate in determining whether he/she is suited to provide a service requested by a customer.

SUMMARY OF THE DESCRIPTION

The present invention concerns a collaborative provider selection system (henceforth referred to as "CPSS") that enables service providers, referred to herein as providers, to effectively self-select the best available provider based on information included in an incoming request for service from a customer.

The subject invention provides a "provider lounge", a collaborative web service that enables providers to view the details of incoming requests for service and to chat amongst themselves. The provider lounge enables providers to collaboratively select the best provider to respond to a request for service. In a preferred embodiment, if no provider responds to an incoming request for service during a pre-defined time interval the CPSS assigns an available provider to respond.

The present invention enables three parties to participate in the selection process, the customer who describes a problem or need by typing a request for service using a web-based chat interface, the provider community which consists of providers that are available and who are signed-in to the provider lounge, and the CPSS which provides information about the customer, monitors the activities of customers and providers, and automates the selection process if no provider responds to an incoming request for service within a predefined time interval.

BRIEF DESCRIPTION OF THE DRAWINGS

The present invention will be more fully understood and appreciated from the following detailed description, taken in conjunction with the drawings in which.

DETAILED DESCRIPTION

The invention is described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the invention may be embodied as methods, processes, systems, business methods, or devices. Accordingly, the present invention may take the form of an entirely hardware embodiment or an embodiment combining software and hardware aspects. The following detailed description is, therefore, not to be taken in a limiting sense.

The present invention concerns a collaborative provider selection system (henceforth referred to as "CPSS") that enables service providers, referred to herein as providers, to effectively self-select the best available provider based on information included an incoming request for service from a customer and from information provided by CPSS to the providers. CPSS includes a website referred to as a "provider lounge" enables providers to view details the details of incoming requests for service and to chat amongst themselves and collaboratively select the best provider to respond to an incoming customer service request. In a preferred embodiment, if no provider responds to an incoming request for service during a pre-defined time interval the CPSS assigns an available provider to respond.

Exemplary Operating Environment

Figure 1:
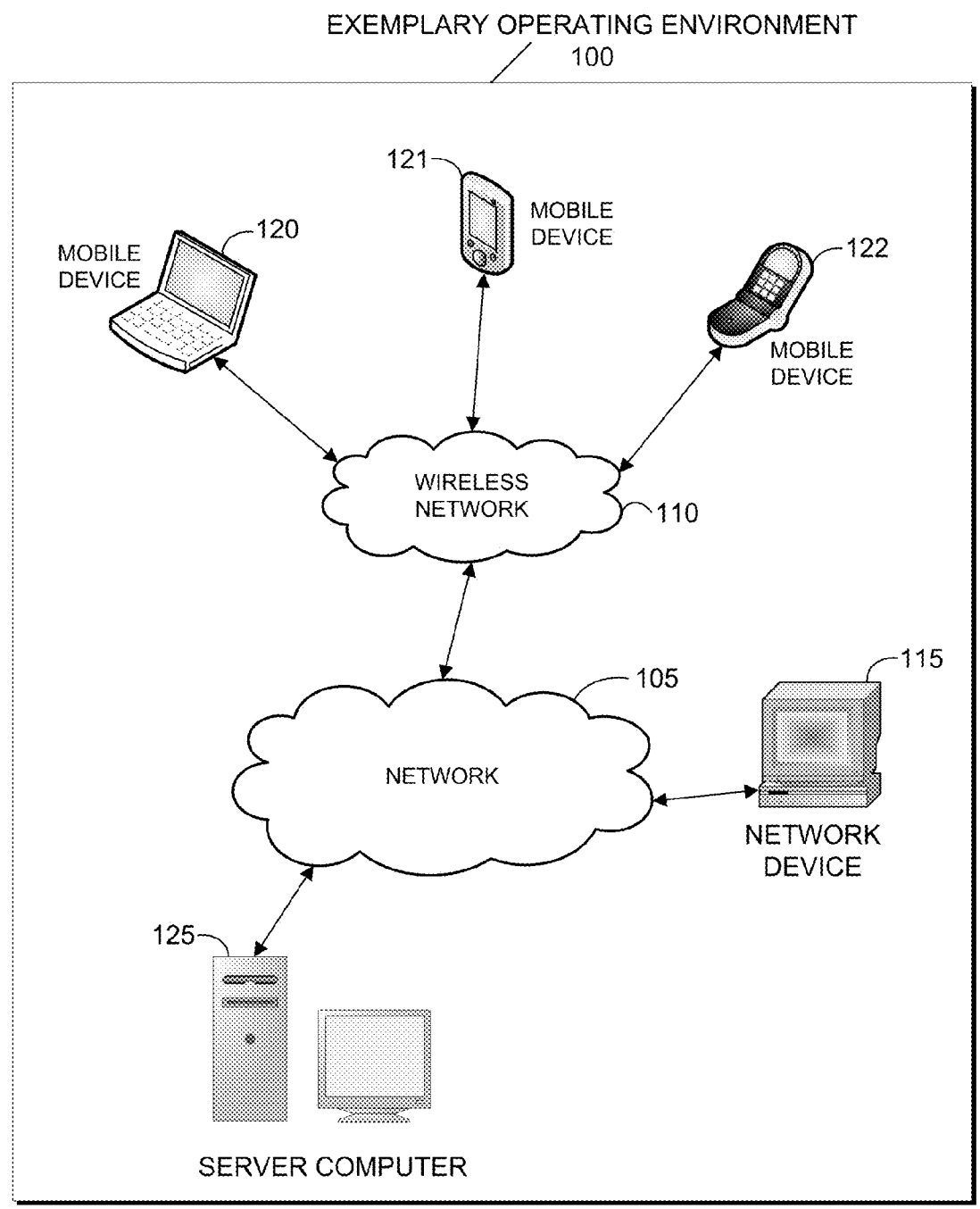
FIG. 1 is an illustration of an exemplary operating environment in which the present invention may operate, in accordance with an embodiment of the present invention.

Now reference is made to FIG. 1, which is an illustration of an exemplary operating environment in which the present invention may operate, in accordance with an embodiment of the present invention. Not all the components may be required to practice the invention, and variations in the arrangement and type of the components may be made without departing from the spirit or scope of the invention. As depicted in FIG. 1, system 100 includes a network 105 that includes one or more interconnected local area networks ("LANs") and wide area networks ("WANs"), a wireless network 110, a network device 115, three mobile devices 120-122, and a server computer 125. Network device 115 and mobile devices 120-122 are client devices that communicate with server computer 125. Client devices may also communicate among themselves using peer-to-peer networking or using a near field communications system.

Network 105 connects server computer 125 to other computing devices, including, to network device 115, and through wireless network 110 to mobile devices 120-122. Also, network 105 can include the Internet in addition to local area networks (LANs), wide area networks (WANs), direct connections, such as through a universal serial bus (USB) port, other forms of computer-readable media, or any combination thereof. In essence, network 105 includes any communication method by which information may travel between server computer 125, network device 115, mobile devices 120-122 and other computing devices as well.

Wireless network 110 is configured in part to couple mobile devices 120-122 with network 105. Wireless network 110 may include any of a variety of wireless sub-networks to connect mobile devices 120-122.

Network device 115 may include virtually any computing device capable of communicating over a network to send and receive information. In this context network device 115 refers to devices that typically connect using a wired or wireless communications medium such as desktop personal computers, laptop personal computers, multiprocessor systems, microprocessor-based or programmable consumer electronics, network PCs, and network appliances.

Generally, mobile devices 120-122 may include any portable computing device capable of receiving and sending a message over a network such as network 105 and wireless network 110. Mobile devices 120-122 include cellular telephones, smart phones, personal digital assistants (PDAs), handheld computers, digital cameras, laptop computers, wearable computers, tablet computers, media players, and video game consoles. Mobile devices 120-122 range widely in terms of capabilities and features. For example, a mobile telephone may have a numeric keypad and a few lines of monochrome LCD display on which only text may be displayed. In another example, a web-enabled mobile device may have an alphanumeric keypad and a LCD display capable of displaying full color presentations, digital photos, word processing documents, email messages and web pages.

Mobile devices 120-122 typically include a web browser application that is configured to receive and to send web pages, web-based messages, and other web-based communications. The web browser application may be configured to display and browse web pages and receive and display a variety of media including photos, music, graphics, and text. Mobile devices 120-122 are typically capable of running mobile applications that send and receive content across wireless network 110. Mobile applications may be capable of receiving, sending, creating, and editing text, photos, audio and music, graphics and other digital media files. The mobile application may further provide information that identifies itself, including a type, capability, and name. Mobile devices 120-122 may uniquely identify themselves through any of a variety of mechanisms, including a phone number, Mobile Identification Number (MIN), an electronic serial number (ESN), or other mobile device identifier.

Mobile devices 120-122 and network device 115 may be configured to include an application that enables a user to log into an account that may be managed by another computing device, such as server computer 125. The account may enable the user to, for example, search for, view and retrieve and select content or merchandise for purchase, and to provide online services such as technical support and customer service. However, participation in these activities may not require the user to log into a customer account.

Server computer 125 may include any computing device capable of connecting to network 105. Further, server computer 125 enables one or more server applications to communicate with clients and/or other server applications operating on other computing devices. Server computer 125 applications include but are not limited to database management systems, web server, digital asset management (DAM), e-commerce, social networking, technical support and customer service.

Furthermore, although FIG. 1 illustrates server computer 125 as a single computing device, the invention is not so limited. For example, one or more functions or applications of server computer 125 may be distributed across one or more other network devices without departing from the spirit and scope of the invention.

Preferred Embodiment

Collaborative Provider Selection System

Figure 2:
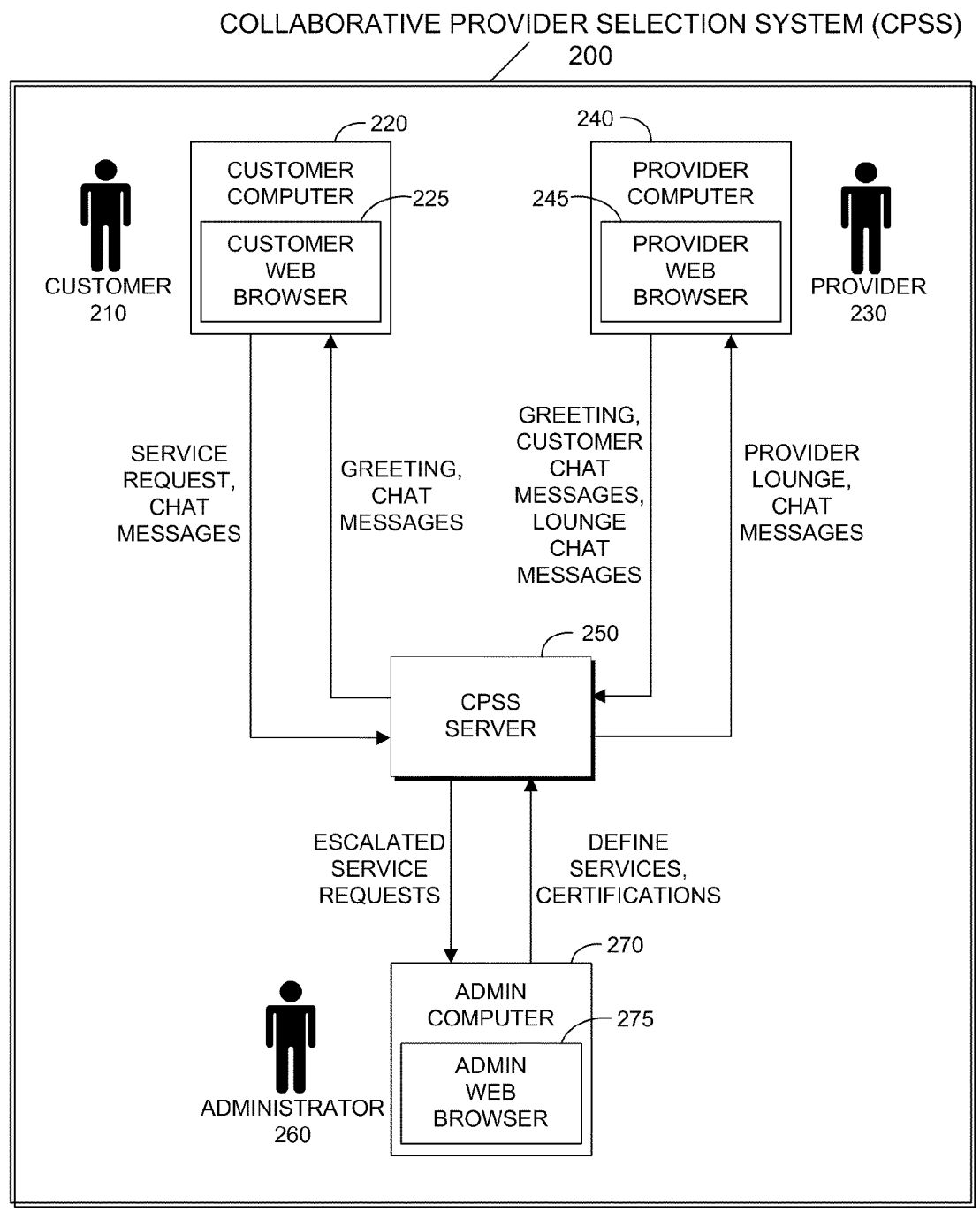
FIG. 2 is a high-level block diagram of a collaborative provider selection system, in accordance with an embodiment of the present invention.

Reference is now made to FIG. 2, which is a high-level block diagram of a collaborative provider selection system, in accordance with an embodiment of the present invention. FIG. 2 depicts a preferred embodiment of a collaborative provider selection system (CPSS) 200 in which a customer 210, using a customer computer 220, uses a website provided by a CPSS server 250 to originate a request for service.

Customer 210 is any person that uses a customer web browser 225 running in customer computer 220 to interact with and obtain services from provider 230. Customer computer 220 may be a network device such as network device 115, or a mobile device such as mobile device 120, 121, or 122.

A provider 230 is a person that uses a provider web browser 245 running in a provider computer 240 to interact with and provide services to customer 210. Provider computer 240 may be a network device such as network device 115 or a mobile device such as mobile device 120, 121, or 122.

Both customer web browser 225 and provider web browser 245 communicate with a CPSS server 250 across a network such as wireless network 105 and/or network 110. Typically customer web browser 225 and provider web browser 245 are commercially available web browser applications such as Mozilla Firefox, Microsoft Internet Explorer, or Apple Safari. Each of the aforementioned web browsers provides client-side scripting capabilities such as those provided by JAVASCRIPT, or Java. A description of JAVASCRIPT may be found in the book JavaScript: The Definitive Guide, by David Flanagan, August 2006, published by O'Reilly Media, Inc.

It may be appreciated that in an alternative embodiment, the functions performed by customer web browser 225 and provider web browser 245 could be performed by a client application or client user interface other than a web browser without altering the scope, or spirit of the subject invention.

Provider 230 may provide services to customer 210 using a computer as, for example, in the case of removing a virus from customer computer 220. Alternatively, the service provided may not involve use of a computer; for example, the service provided may be house painting. All that is implied and necessary with respect to the subject invention is that customer 210 originate a service request using CPSS 200 and that provider 230 respond to the service request using CPSS 200. In some cases, provider 230 will provide all services necessary to respond to the service request using facilities provided by CPSS 200. In other cases, some or all of the services provided by provider 230 will not require use of CPSS 200.

CPSS server 250 is a server computer such as server computer 125 that provides services to customer 210 via customer web browser 225 and to provider 230 via provider web browser 245. Such services include but are not limited to providing a website that enables customer 210 to originate a request for service and to interact with provider 230 using interactive chat, and to providing a provider lounge that enables provider 230 to interact with other providers and to respond to incoming customer service requests.

In addition, CPSS server 250 enables a CPSS administrator, not depicted, to perform administrative functions. Functions that may be performed by a CPSS administrator include inter alia dispute resolution, reviewing transactions, defining reports and user management.

Further customer 210 and provider 230 may interactively chat, i.e. exchange textual messages, images, sound and other types of media. In one embodiment, chat messages flow through CPSS server 250. In addition, CPSS 200 may provide a screen sharing capability that enables provider 230 to remotely control customer computer 220.

Exemplary User Interfaces

Figure 3A:
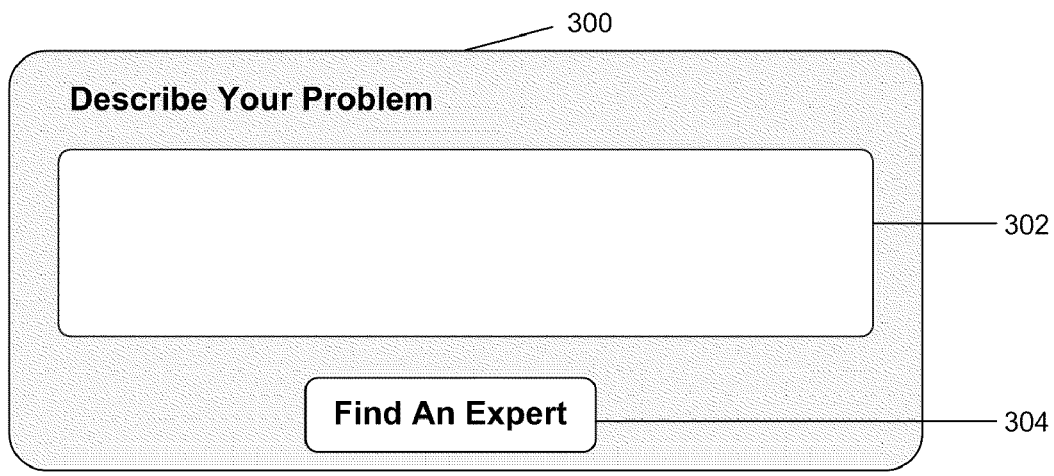
FIG. 3A is an example user interface that enables a customer to originate a service request, in accordance with an embodiment of the present invention.
Figure 3B:
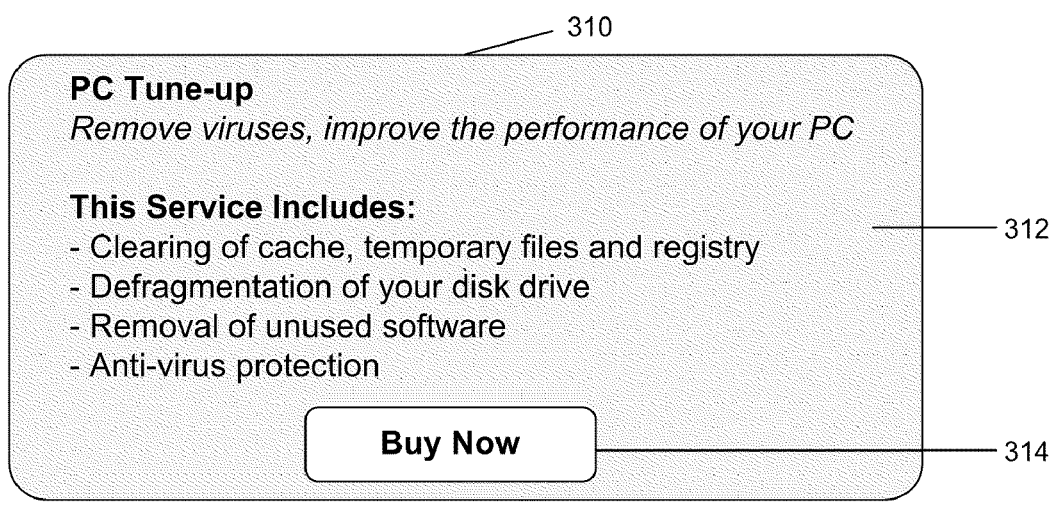
FIG. 3B is an example user interface that enables a customer to select a service package, in accordance with an embodiment of the present invention.

FIGS. 3A and 3B describe two ways in which customer 210 may initiate interaction with CPSS 200. In one approach, described with reference to FIG. 3A, customer 210 uses a user interface provided by CPSS server 250 to describes a service that he/she would like to obtain. In FIG. 3B, customer 210 views a web-based advertisement that describes a service package and enables customer 210 to purchase the service package. The term service package refers to a service to be performed by a service provider that can be selected or purchased in advance by a customer. Information about service packages is stored in a service database described below with reference to FIG. 5.

Now reference is made to FIG. 3A, which is an example user interface 300 that enables a customer to originate a service request, in accordance with an embodiment of the present invention. User interface 300 provides an entry box 302 into which customer 210 may enter a description of a problem that he/she wants help with. When customer 210 finishes entering the problem description he/she selects a find expert control 304.

Typically, user interface 300 is included in a web page on a customer service or technical service website. For example, this might be a general technical support website or it might, for example, be a technical support website provided by a computer or automotive manufacturer.

Now reference is made to FIG. 3B, which is an example user interface 300 that enables customer 210 to select a service package, in accordance with an embodiment of the present invention. User interface 300 displays descriptive information 312 about a service package. Descriptive information 312 may include a name of the service package, a description of the services to be provided, a price and the like. To purchase the service package, customer 210 uses a buy now control 314. Customer 210 is then prompted to electronically purchase the service package using an electronic payment system provided by CPSS server 250. If customer 210 hasn't previously registered as a customer with CPSS server 250 then registration occurs as part of the payment process.

Typically, user interface 310 is included in a web page on a customer service or technical service website. User interface 310 might be implemented as a "landing page", a special web page that is reached as a result of clicking on a hyperlink in a web page. For example, a computer manufacturer's website might include links to one or more such landing pages as a way to offer technical support for the manufacturer's products.

Figure 3C:
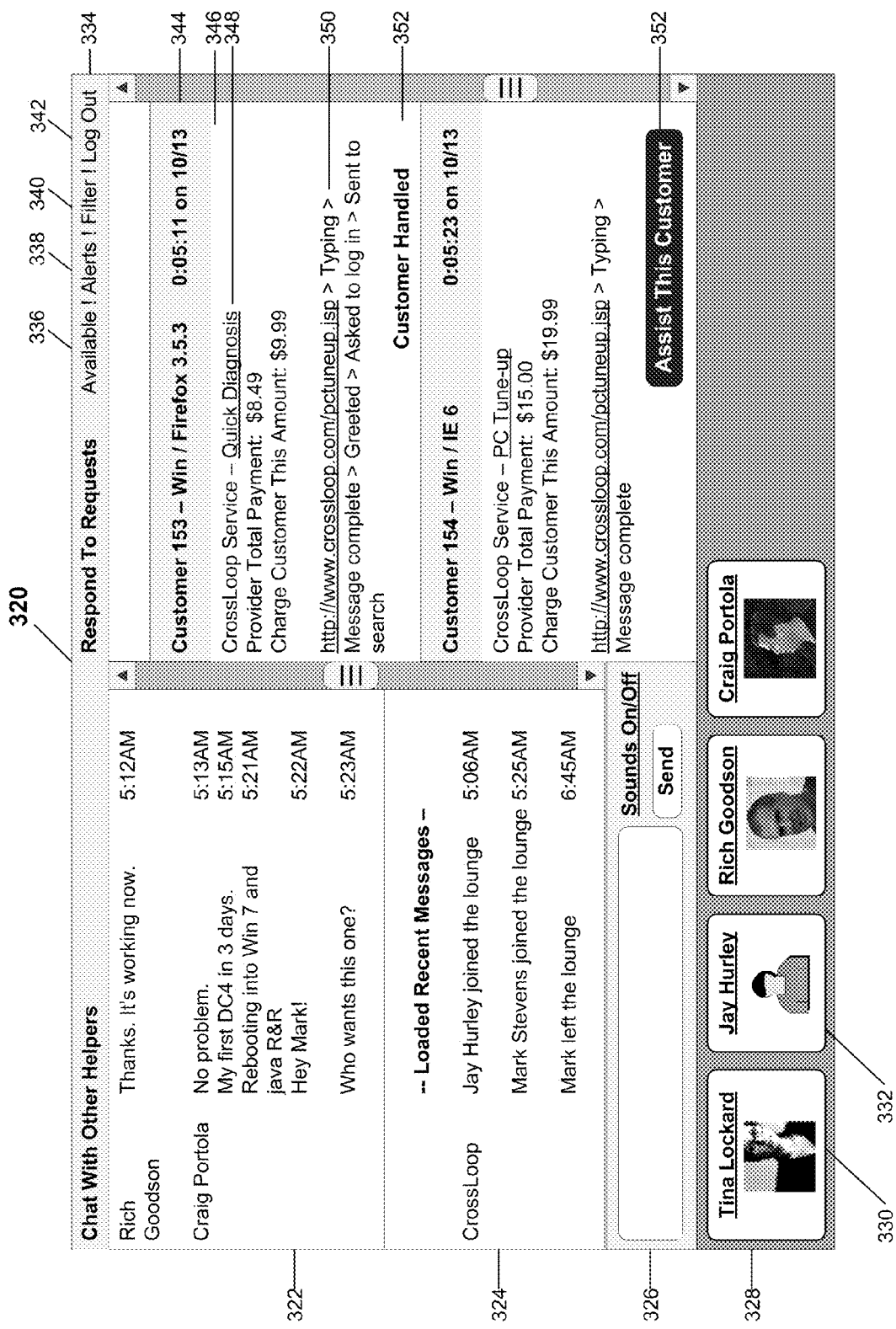
FIG. 3C is an example user interface for a provider lounge that enables a provider to interact with other providers, and to view and respond to incoming customer service requests, in accordance with an embodiment of the present invention.

Now reference is made to FIG. 3C, which is an example user interface for a provider lounge that enables a provider to interact with other providers, and to view and respond to incoming customer service requests, in accordance with an embodiment of the present invention. In the preferred embodiment, provider lounge 320 is a web user interface provided by CPSS server 260 and displayed by provider web browser 245. A provider lounge chat window 322 enables provider 230 to view chat messages entered by all providers currently logged in. Provider 230, as well as other providers currently logged in, may enter a message using a chat entry window 326. Chat entry window 326 includes a chat entry box for typing text, a sound control, and a send control. To enter a new message provider 230 types text into the chat entry box and clicks on the send control. Provider 230 uses the sound control to control the use of sound for alerts such as to announce the receipt of a message. A recent messages window 324 shows a scrolling list of recent messages, from most recent to oldest, entered by providers.

A presence window 328 shows a scrolling list of provider panes. Each provider pane 330 represents a different provider that is currently logged in. Provider pane 330 indicates whether a provider is available or if they are temporarily unavailable. If a provider is temporarily unavailable provider pane 330 is grayed. Other mechanisms can also be used to indicate provider availability. Further, special information about providers can be indicated visually in provider pane 330. For example, a special icon that appears in the provider pane for Jay Hurley 332 indicates that he is an administrator.

On the right side of provider lounge 320, a customer window 344 shows a scrolling list of customer panes 346. Each customer pane 346 provides information for a customer including but not limited to, a unique customer number, a session status message 350, the name of the service package, if any, the customer purchased, how much money a provider will make if he/she services the customer, and how much the customer will be charged for the service.

When customer 210 begins to type text into entry box 302 in user interface 300, a new customer pane 346 is created and appears at the top of customer window 344. The text appears inside the new customer pane 346 in real-time as customer 210 types it. This enables all providers currently logged into provider lounge 320 to view the incoming service request in real-time, i.e., without having to wait for customer 210 to finish entering the entire service request. This further enables providers to respond more quickly to the new service request than would be the case if providers had to wait until customer 210 entered the entire service request before seeing the text.

A new customer pane 346 is also created and appears inside customer window 344 when customer 210 purchases a service package using user interface 310. In this case, the name of the service package purchased displays in a service assistance control 348. Provider 230 may select service assistance control 348 to obtain further information about the service package purchased by the customer. It may be noted that in example provider lounge 320, a service package is referred to as a "service". Examples of such service packages include, but are not limited to, performance tuning, eliminating viruses, and installing antiviral software. In one embodiment, when provider 230 selects service assistance control 348 instructions specifying how to perform the service package display in a separate browser window.

Customer pane 346 also includes a customer control 352. When a customer pane 346 first appears a provider can select customer control 352 to respond to the corresponding service request. In example user interface 320, when a service request is waiting for a response by a provider, customer control 352 displays the text "Assist This Customer." In one embodiment, assist customer control 352 only appears in customer pane 346 for those providers that are certified to assist the customer. Certifications are discussed with reference to FIG. 4.

Customer status message 350 provides real-time status information and provides a brief text message for of each of the states that has occurred since customer pane 346 was created. A list of session states is provided below in Table 1 below:

TABLE 1

Session States

| State | When it Occurs |
|---|---|
| Typing | Customer is typing service request using user interface 300 |
| Message Complete | Customer finished typing service request using user interface 3A and selected find an expert control 304. |
| Purchased Service package | Customer purchased a service package |
| Greeted | Provider sent greeting message to customer |
| Asked to Login | Customer was asked to login |
| Closed Login | Customer completed login |
| Customer Has Left | Customer has left the web page prior to using find expert control 304 |
| Sent To Search | No provider currently in lounge can help the customer. The customer is sent to search. |
| Automatch | No provider in lounge responded in time. The customer is being automatically matched with a provider. |
| Couldn't Help | The customer was connected to a provider but the provider was not able to provide the requested service |
| Previously Helped | The customer previously received help from a provider but the case isn't yet closed. A message from the provider may be included along with this message. |

The "customer has left" session state occurs in several cases, including: when customer 210 uses customer web browser 225 to leave the web page that displays user interface 300 prior to selecting find expert control 304, and when customer 210 uses find expert control 304 after entering a service request but then leaves the leave the web page that displays user interface 300 before engaging with a provider.

The chat facility, as implemented by chat window 322 and chat entry window 326, enables providers to discuss an incoming service request, for example to identify specific technical requirements or to suggest solutions to each other. It enables providers to share information and to collaboratively determine which provider is best suited to respond to an incoming service request. This form of group selection constitutes a new and unique approach to assigning a provider or agent to a given technical support, customer support or other service request.

Provider lounge 320 provides several provider controls 334. Provider controls 334 include an availability control 336 that enables provider 230 to indicate that he/she is or is not available, an alert control 338 that enables provider 230 to set alerts and to turn alerts on or off, a filter control 340, described below, and a login control 342 that enables provider 230 to log in and log out.

After selecting alert control 338, provider 230 is prompted to enter a SMS number, phone number, email address or other electronic address. Consequently, provider 230 will receive an electronic alert at the provided electronic address when a new customer enters provider lounge 320.

Filter control 340 enables provider 230 to select among several filter settings. The settings cause messages of a certain type to be alternatively collapsed or expanded. Types of settings include customers whose problems have been completed or handled, customers whose problems are in progress, customers whose problems were lost, i.e. customers who left the browser screen or site prior to completion, and customers who have left the system.

CPSS 200 provides three alternative methods for assigning a provider to respond to an incoming service request in the event that no provider selects assist customer control 352 within a specified time period. The three methods are (1) automatic matching, (2) sending the customer to search, and (3) call back. In one embodiment, CPSS server 250 starts a countdown timer with a predefined duration once customer 210 selects find expert control 304. If no provider selects assist customer control 350 to respond to the service request made by customer 210 before the countdown timer expires, then CPSS server 250 takes over and employs one of the three methods. Thus, providers active in provider lounge 320 have the first opportunity to assist customer 210; but CPSS server 250 ensures that a capable provider is assigned within a specified period of time.

In automatic matching, CPSS server 250 uses stored information about providers to select a provider that is qualified and likely to be available and assign the service request to the selected provider. For example, CPSS server 250 might select a provider that is currently logged on and hence available, and who has passed a general certification test. Certifications are described below with reference to FIG. 4. If more than one provider meets these criteria then CPSS server 250 might select a provider that has not recently responded to a service request.

In sending a customer to search, the second method, customer 210 is presented with a search page that enables him/her to search for and select a provider to respond to their service request. In the third method, call back, the CPSS server 250 sends customer 210 a message explaining that no provider can respond to his/her service request at the present time and that a provider will contact him/her later. CPSS server 250 then forwards the service request to administrator 260 who then takes responsibility for finding a provider to respond to the service request.

Figure 3D:
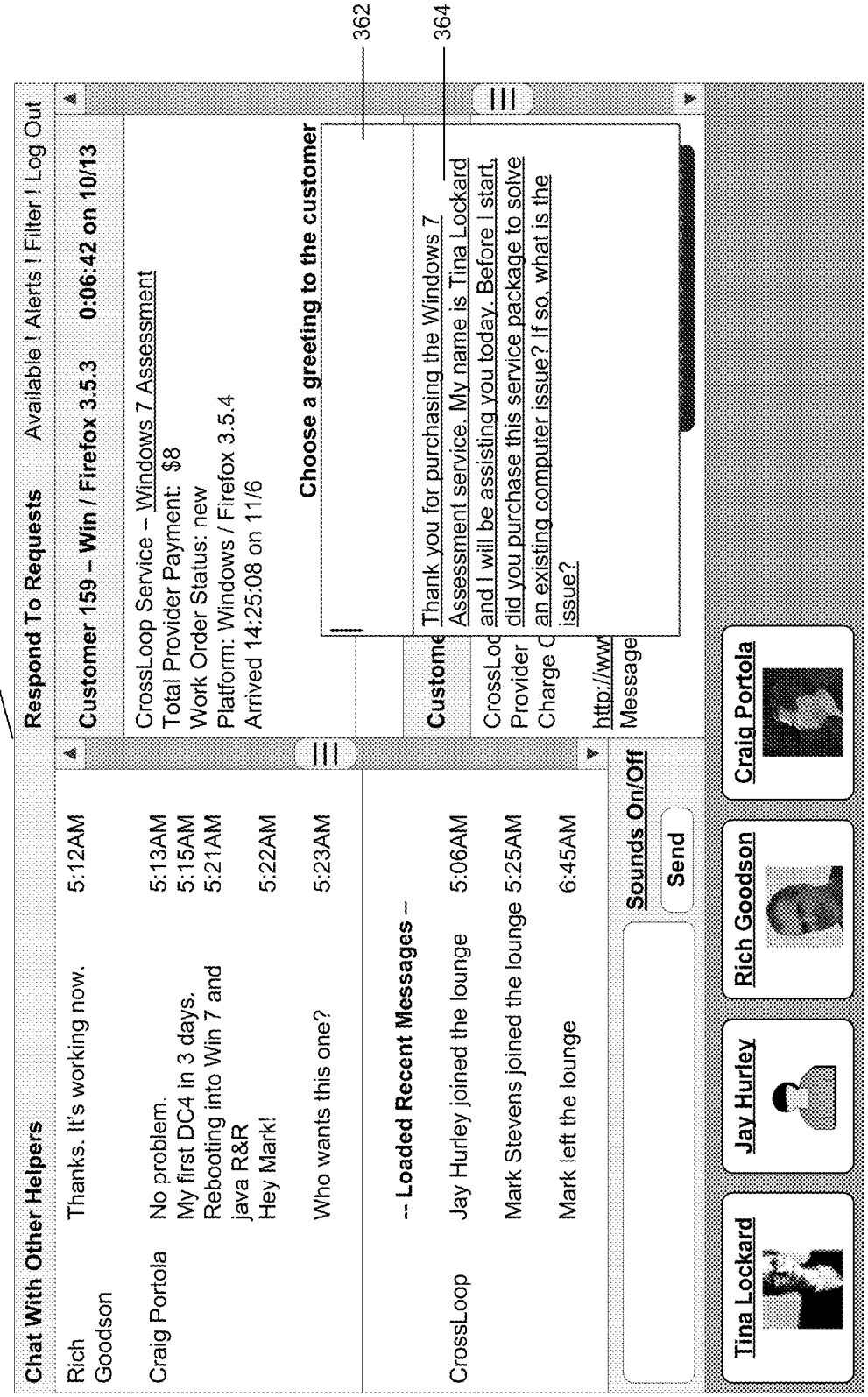
FIG. 3D is an example user interface that enables a provider to create and send a service offer to a customer, in accordance with an embodiment of the present invention.

Now reference is made to FIG. 3D, which is an example user interface that enables a provider to create and send a service offer to a customer, in accordance with an embodiment of the present invention. When provider 230 selects assist customer control 350, previously described with reference to FIG. 3C, a greeting user interface 360 overlays user interface 320 that enables provider 230 to create a service offer. Provider 230 may type a custom greeting message to customer 210 using entry box 362. If customer 210 purchased a service package, then a list of greetings 364 appears and provider 230 can select one. List of greetings 364 includes a list of greeting messages that are appropriate to the service package purchased by customer 210. When provider 230 finishes creating the greeting message he/she presses the enter key or selects a send control to send the greeting message to customer web browser 225.

Figure 3E:
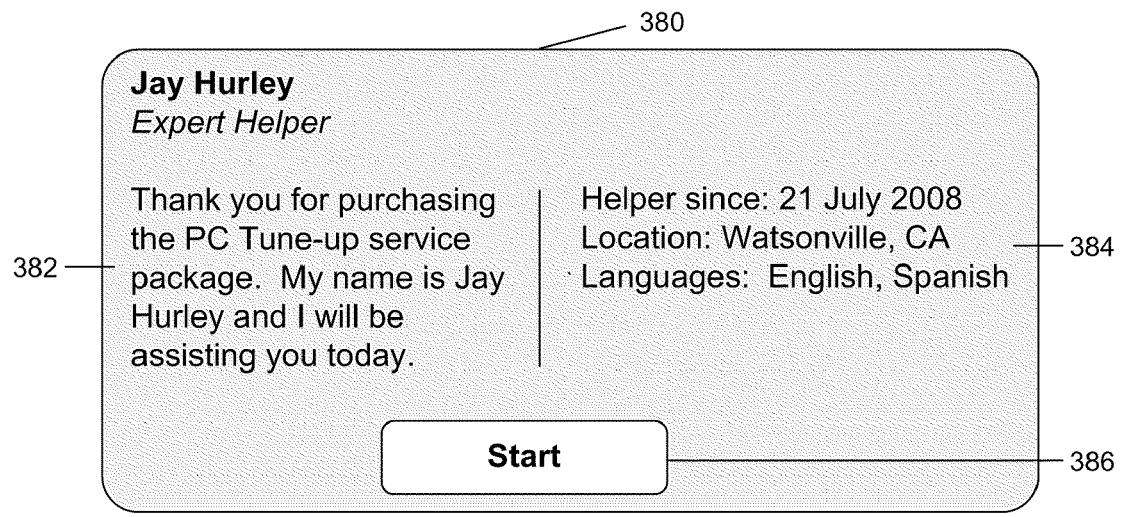
FIG. 3E is an example user interface that displays a service offer to a customer from a provider and enables the customer to accept the service offer, in accordance with an embodiment of the present invention.

Now reference is made to FIG. 3E, which is an example user interface that displays a service offer to a customer from a provider and enables the customer to accept the provider's service offer, in accordance with an embodiment of the present invention. When provider 230 sends a greeting message, also referred to as a service offer, to customer 210, as described with reference to FIG. 3D, the service offer displays in a message area 382 inside a greeting user interface 380 displayed by customer web browser 225. If customer 210 accepts the service offer by selecting a start control 384 then if he/she has not previously logged in then at this point he/she is requested to login. If customer 210 has not previously registered then he/she is asked to register before a service session is initiated. When customer 210 registers, CPSS server 250 creates a new customer account for customer 210. At this point, a service session begins and subsequent interaction is one-to-one between provider 230 and customer 210.

Figure 3F:
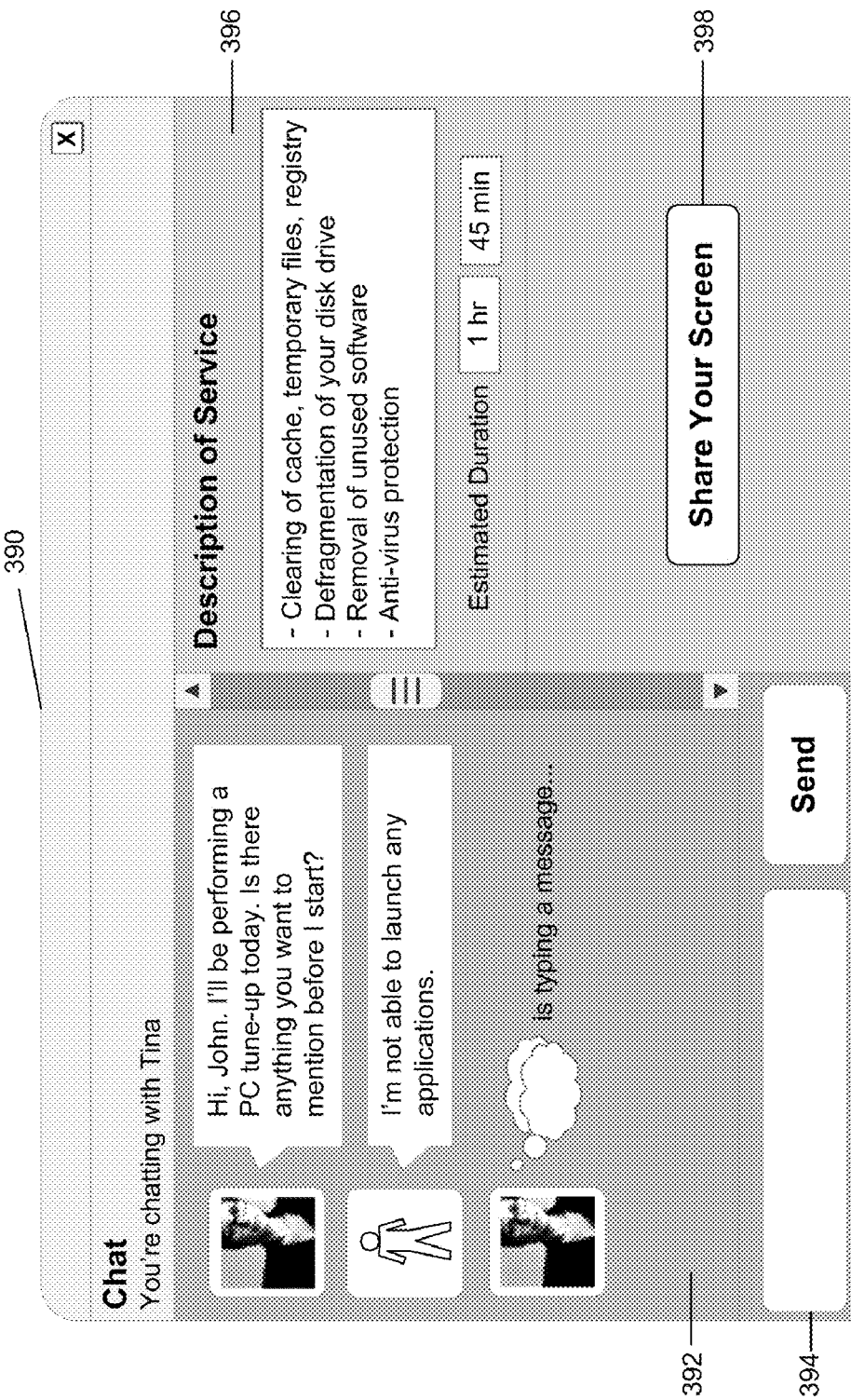
FIG. 3F is an example user interface that enables a customer and a provider to chat, in accordance with an embodiment of the present invention.

Now reference is made to FIG. 3F, which is an example user interface that enables a customer and a provider to chat, in accordance with an embodiment of the present invention. Example user interface 390 appears once customer 210 initiates a service session by selecting start control 384. An interactive chat window 392 displays a scrolling list of each chat message entered by either customer 210 or provider 230. A chat entry window 394 enables customer 210 to enter a chat message. An information and control window 396 displays information deemed by CPSS server 250 to be useful to customer 210 and provides controls. A screen share control 398 indicates that provider 230 has requested that customer 210 share their screen. Customer 398 may select share control 398 to share his/her screen with provider 230. By electing to share his/her screen, customer 210 allows provider 230 to remotely control customer computer 220. This enables provider 230 to perform a wide range of services on customer computer 220 such as a performance tune-up or installation of the latest version of a computer operating system.

Provider Certification

As previously discussed, in some cases provider 230 must be certified in order to respond to a service request. Such cases include inter alia (1) if a specific certification is required for a service provider to provide a service package, and (2) if provider 230 is to be considered as a potential match for an incoming service request when CPSS server 250 automatically matches a provider to the service request. A certification is a set of requirements that a provider must meet in order to be allowed to respond to a service request that requires the certification. Requirements include a background check, various levels of administrative approval, a general certification test that checks for technical literacy, a personal interview, and technical specialty tests such as networking, Windows Vista, security and the like. For purposes of consistency, a provider is said to pass a certification if he/she meets its requirements.

Figure 4:
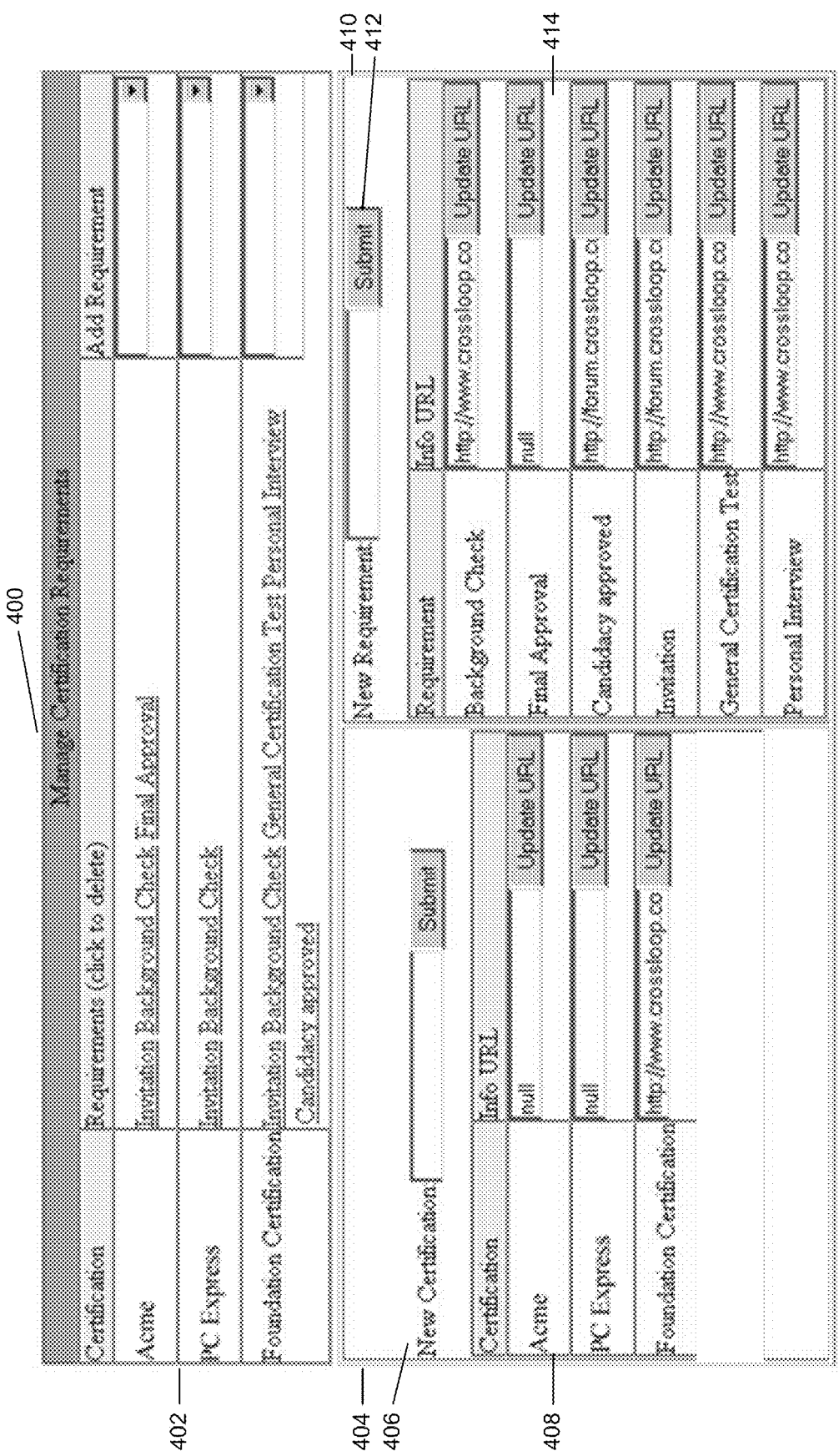
FIG. 4 is an example administrative user interface that enables a collaborative provider selection system administrator to specify certifications, in accord with an embodiment of the present invention.

Now reference is made to FIG. 4, which is an example administrative user interface that enables a collaborative provider selection system administrator to specify certifications, in accord with an embodiment of the present invention. Generally a CPSS 200 administrative user, referred to henceforth as administrator 260, uses user interface 400 to manage certifications. A certifications summary window 402 allows administrator 260 to add and delete requirements from each certification. In the example, there are three certifications, Acme, PC Express and Foundation Certification. In the example, Acme and PC Express refer to hypothetical companies that use CPSS 200 to provide technical support for their products. The company, Acme or PC Express, establishes a certification that a provider must pass in order to handle service requests from customers of Acme or PC Express. Whether a customer is associated with a specific company, e.g. Acme or PC Express, is indicated in a customer record for the customer in a customer database, as described below with reference to FIG. 5. Thus, a provider that wishes to respond to service requests from customers of Acme or PC Express must have previously passed the corresponding certification by meeting the requirements for the certification. Further, a specific service package can have a certification associated. In this case, a service provider can only provide the service package, i.e. respond to a service request that results from a customer purchasing a specific service package, if the provider previously passed certification required by the service package.

A certifications window 404 includes a new certification control 406 that enables administrator 260 to add a new certification and a certification info table 408 that enables administrator 260 to add a hyperlink to a web page that provides information about a certification.

A requirements window 410 includes a new requirement control 412 that enables administrator 260 to add a new requirement and a requirement info table 414 that enables administrator 260 to add a hyperlink to a web page that provides information about a requirement.

CPSS server 250 stores information created or updated using user interface 400 in a certification database, described with reference to FIG. 5.

An additional administrative interface, not depicted, is provided by CPSS sever 250 that enables administrator 260 to specify what requirements a given provider has satisfied, and which certifications he/she has achieved. This information is stored by CPSS server 250 in a provider database, discussed in further detail with reference to FIG. 5.

Figure 5:
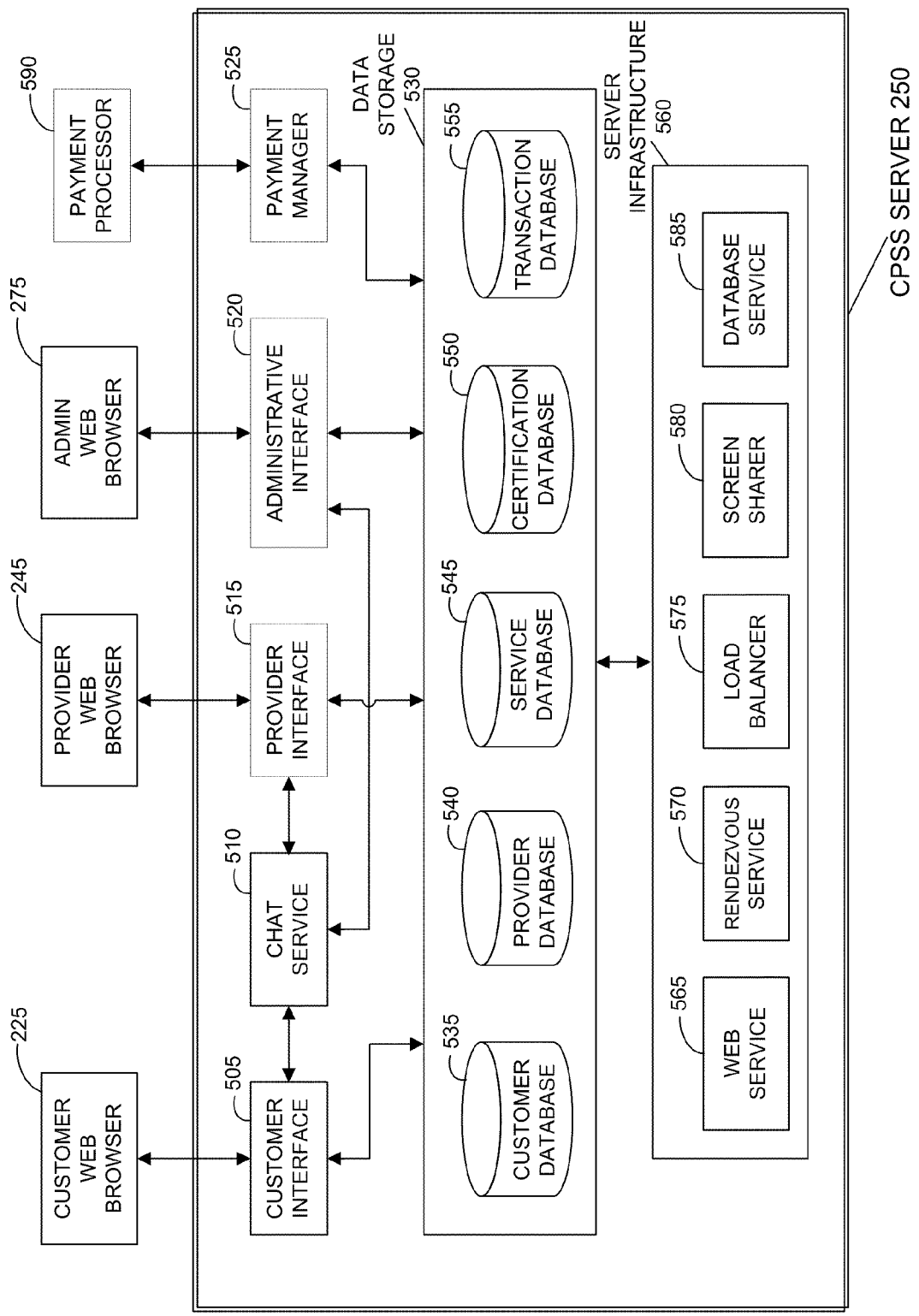
FIG. 5 is an example software architecture for a collaborative provider selection system server computer, in accord with an embodiment of the present invention.

Now reference is made to FIG. 5, which is an example software architecture for a collaborative provider selection system server computer, in accord with an embodiment of the present invention. The software architecture illustrated in FIG. 5 shows the software components that provide the custom, i.e. application specific, logic performed by CPSS server 250. CPSS server 250 includes a customer interface 505, a chat service 510, a provider interface 515, an administrative interface 520, a payment manager 525, a data storage 530, and a server infrastructure 560. Data storage 530 includes a number of logical databases, namely customer database 535, provider database 545, provider database 540, service database 545, certification database 550 and transaction database 555. Server infrastructure 560 includes a collection of relatively standard sub components available from third parties for integration into an Internet server. Server infrastructure 560 includes a web service 565, a rendezvous service 570, a load balancer 575, a screen sharer 580, and a database service 585.

Customer interface 505 handles interaction between customer web browser 225 and CPSS server 250. It enables customer web browser 225 to receive and send chat messages via CPSS server 250 to provider web browser 245 and to interact with CPSS server 250 using structured forms. Additionally, in one embodiment, customer interface 505 enables customer computer 220 to be remotely controlled by provider 230 using screen sharer 580.

Chat service 510 enables customer web browser 225 and provider web browser 245 to interactively chat, i.e. exchange chat messages. Further, CPSS server 250 may use chat service 510 to send messages to customer web browser 225, provider web browser 245 and admin web browser 275. Chat service 510 also enables multiple providers to exchange chat messages in provider lounge 320. To accomplish this, chat service 510 tracks presence status for each provider logged in to provider lounge 320. In one embodiment, chat service 510 is based on the widely adopted open protocol for instant messaging, XMPP (also named Jabber). XMPP was formalized by the IETF in 2002-2004 and is maintained by the XMPP Standards Foundation which can be found at http://xmpp.org/. Numerous developer tools are available for implementing XMPP in an Internet server.

Customer interface 505 uses rendezvous service 570 to establish client-server communications between customer web browser 225 and web browser 245. In one embodiment, CPSS 200 does not support unattended sessions and requires the presence of a person to accept a session request from the person on the other side. For example, if customer 210 identifies a potential provider using a provider search interface and wants to initiate a chat session, it is necessary for the provider to be present in order to initiate the session. Customer interface 505 generates a session ID for each session between customer 210 and provider 230. The session ID is used as a key to encrypt communications. Files and messages exchanged across CPSS 200 are encrypted to ensure user privacy. In one embodiment, data is encrypted at the endpoints using a 128-bit encryption method provided by Blowfish. Blowfish is a symmetric block cipher encryption algorithm. Further information about Blowfish can be found on the Internet at http://www.schneier.com/blowfish.html.

In one embodiment the session ID is used as a key to store all session information in transaction database 555. In one embodiment, if customer 210 and provider 230 do not conclude a transaction during a single session, when they resume communications the new session is linked using the session ID; thus a transaction which comprises multiple sessions can be reconstituted from transaction history database 550.

Provider interface 515 handles interaction between provider web browser 245 and CPSS server 250. It enables provider web browser 245 to receive and send chat messages and to interact using structured forms. Additionally provider interface 515 enables provider 230 to remotely control customer computer 220 via screen sharer 580, typically for purposes of performing a technical support service. Provider interface 515 is responsible for assigning a provider to respond to an incoming service request in the event that no provider responds to the service request within a specified time period. To accomplish this, provider interface 515 implements one or more of the selection methods described above with reference to FIG. 3C.

Payment manager 525 uses the payment method information provided by customer 210 during or subsequent to registration to authorize and settle electronic payments. In one embodiment, payment manager 525 causes the payment to be deposited directly into a customer payments bank account managed by CPSS 200. Payment manager 525 can access a plurality electronic payment systems, including PayPal, a service owned and operated by eBay, Inc. of Mountain View, Calif., and standard credit card networks including VISA, MasterCard and American Express.

Customer database 535 stores the name, contact information, date registered and method of payment information for each registered customer 210 in a customer account record. The customer account record also indicates if the customer is associated with a particular company and which company. As described with reference to FIG. 4 a company may have an associated certification. Customer database 535 additionally stores historical information for each customer in a customer history record. The customer history record includes the customer name and summary information for each session that he/she has transacted. Session information includes the service requested, the date, the name of the service provider, evaluation by the customer of the provider, and payment details.

Provider database 540 stores for each registered provider 230 a provider record that includes a provider id, a provider name, contact information, date registered, payment information, a list of requirements the provider has met and a list of certifications the provider has passed. Provider database 540 additionally stores historical information for each provider in a provider history record. The provider history record includes the provider name and summary information for each session that he/she has transacted. Session information includes the service requested, the date, the name of the customer, evaluation by the provider of the customer, and payment details.

Service database 545 stores information about service packages. Information about each service package is stored in a service package record. The service package record includes fields for a service package including a unique service package id, a name of the service package, a description of the service package, a URL of a web page where information about the service package can be found, and an optional certification id required by a service provider.

Certification database 550 stores information about certifications. Information about each certification is stored in a certification record. The certification record a certification id, a list of requirements required for the certification and a URL of a web page where information about the certification can be found. Information about each requirement is stored in a requirement record which includes a requirement id, the name or title of the requirement and a URL of a web page where information about the requirement can be found.

Transaction database 555 stores a record of each session between a customer and a provider. Such record includes a session id for each session in the transaction, each message exchanged between customer 210 and provider 230 and data for each form exchanged between customer 210 and provider 230. Transaction database 555 further stores a record of all messages exchanged in provider lounge 320. Transaction database 555 also stores a record of each payment received and disbursement made by payment manager 525.

Web service 565 provides a standard Web server capability such as that provided by the Apache Web Server. Further information about the Apache Web Server can be found at http://www.apache.org/. In addition, Web service 565 may include a mechanism for extending the functionality of a Web server such as that provided by a Java Enterprise Edition application server such as JBoss. JBoss is provided by Red Hat, Inc. of Raleigh, N.C. Further information about JBoss can be found at http://www.redhat.com/.

Rendezvous service 570 allows a client computer to exchange messages with other peers on the network. It enables customer web browser 225 to exchange messages such as interactive chat messages or screen sharing data, with provider web browser 245. In one embodiment, the rendezvous service is based on the JXTA open source peer-to-peer protocol. Further information about JXTA can be found at https://jxta.dev.java.net/.

Load balancer 575 enables a group of physical computer servers to implement CPSS server 250 by running the various software applications and services as if they were running on a single server. In one embodiment, load balancer 575 is implemented using JBoss from Red Hat.

Screen sharer 580 enables customer computer 220 to be remotely operated by provider 230. For example, screen sharer 580 enables provider 230 to look at data on customer computer 220 and to remotely execute and view the results of programs on the client computer used by customer 210. In one embodiment, screen sharer 580 functions are performed by a TightVNC software plug-in that is downloaded and run in both customer computer 220 and provider computer 240. TightVNC is an open source remote control software package maintained by Constantin Kaplinsky. Additional information about one embodiment of screen sharer 580 is available at http://www.crossloop.com/ipage.htm?id=howitworks.

Database service 585 enables CPSS server 250 to implement and access standard SQL relational databases through an ODBC or JDBC interface. In one embodiment, customer database 535, provider database 540, service database 545 certification database 550, and transaction database 555 are implemented as SQL databases and are accessed using database service 585. Access to the underlying database management system (DBMS) is provided using the ODBC or JDBC interface. Further the underlying DBMS is typically provided using a standard DBMS such as Oracle from Oracle Corporation of Redwood Shores, Calif.

Overall Method

Figure 6:
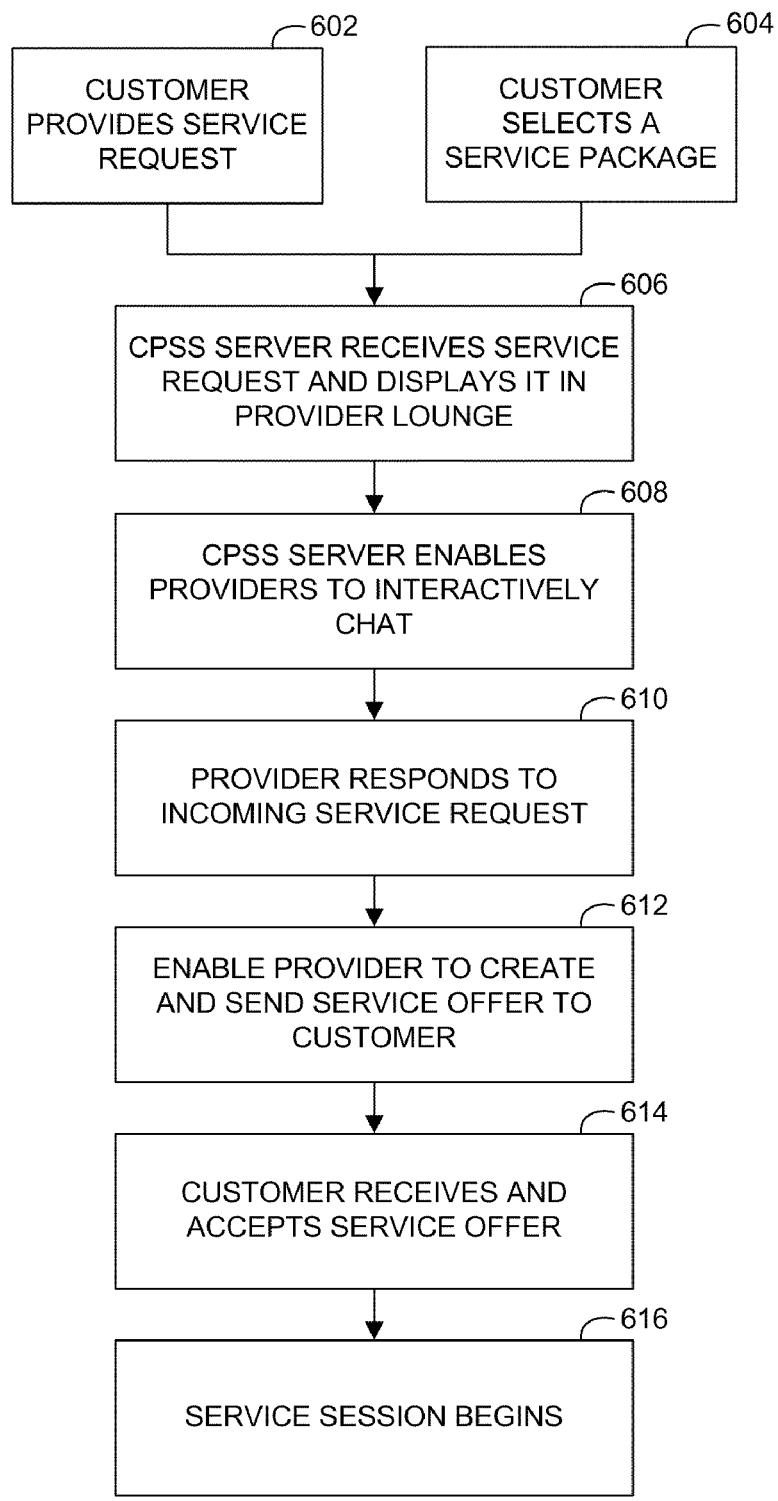
FIG. 6 is a flow diagram that illustrates a simplified overall method performed by a collaborative provider selection system, in accordance with an embodiment of the present invention.

Reference is now made to FIG. 6, which is a flow diagram that illustrates a simplified overall method performed by a collaborative provider selection system (CPSS), in accordance with an embodiment of the present invention. There are two alternative entry points for the method. At the first entry point, step 602, customer 210 provides a service request using a user interface such as user interface 300. Alternatively, at step 604 customer 210 may use a user interface such as user interface 310 to select a service package. In one embodiment, step 604 also includes electronically paying for the service package by customer 210 after selecting a service package.

At step 606 CPSS server 250 receives a service request from customer 210 and displays it using a user interface such as provider lounge 320. At step 608 CPSS server enables providers to interactively chat in order to collaboratively determine which provider will respond to the incoming service request. The interactive chat service provided by CPSS server 250 enables providers to chat on any subject and does not limit them to only chatting about service requests.

At step 610 provider 230 responds to the incoming service request from customer 210 by selecting assist customer control 350. At step 612 CPSS server enables provider 230 to create a service offer and send it electronically to customer 210. At step 614 customer 210 receives the service offer from provider 230 and accepts the service offer using a user interface such as user interface 380. Finally, at step 616 a service session between customer 210 and provider 230 begins and the two participants can directly communicate about the service request.

In reading the above description, persons skilled in the art will realize that there are many apparent variations that can be applied to the methods and systems described.

What is claimed is:

1. A method for customer service, comprising:
  enabling a customer to provide a request for service, wherein said request for service includes a text message entered by the customer;
  receiving the request for service from the customer;
  providing a website that enables a service provider to:
    view the request for service, wherein said viewing enables the service provider to view the text message entered by the customer in real-time without waiting for the entire text message to be entered by the customer;
    interactively chat about the request for service with other service providers, and
    respond to the request for service by creating and sending an offer of service to the customer; and
  enabling the customer to accept the offer of service.

2. The method of claim 1 further comprising automatically selecting a service provider to respond to the request for service if no service provider has responded within a specified period of time after receipt of the request for service.

3. A system for entering into and performing a service agreement, comprising:
  a customer interface for:
    enabling a customer to provide a request for service, said request for service including a text message entered by the customer;
    receiving the request for service from the customer; and
    enabling the customer to accept an offer of service from a service provider; and
  a website that enables a service provider to:

view the request for service, wherein said viewing enables the service provider to view the text message entered by the customer in real-time without waiting for the entire text message to be entered by the customer;

interactively chat about the request for service with other service providers, and respond to the request for service by creating and sending an offer of service to the customer.

4. The system of claim 3 further comprising a provider interface for automatically selecting a service provider to respond to the request for service if no service provider has responded within a specified period of time after receipt of the request for service.

5. A computer readable storage medium storing program code for causing a computing device:

to enable a customer to provide a request for service, wherein said request for service includes a text message entered by the customer;

to receive the request for service from the customer;

to provide a website that enables a service provider to view the request for service, wherein said viewing enables the service provider to view the text message entered by the customer in real-time without waiting for the entire text message to be entered by the customer;

interactively chat about the request for service with other service providers, and respond to the request for service by creating and sending an offer of service to the customer; and to enable the customer to accept the offer of service.

* * * * *

UNITED STATES PATENT AND TRADEMARK OFFICE
CERTIFICATE OF CORRECTION

PATENT NO. : 8,126,781 B2
APPLICATION NO. : 12/643949
DATED : February 28, 2012
INVENTOR(S) : Jay Hurley, Vikram Subramaniam and Greg McCullough Page 1 of 1

It is certified that error appears in the above-identified patent and that said Letters Patent is hereby corrected as shown below:

Title page, item (73), should read;

Assignee: CROSSLOOP, INC., Monterey, CA (US)

Signed and Sealed this
Tenth Day of July, 2012

David J. Kappos
*Director of the United States Patent and Trademark Office*